United States Patent
Chen et al.

(10) Patent No.: US 11,967,152 B2
(45) Date of Patent: Apr. 23, 2024

(54) VIDEO CLASSIFICATION MODEL CONSTRUCTION METHOD AND APPARATUS, VIDEO CLASSIFICATION METHOD AND APPARATUS, DEVICE, AND MEDIUM

(71) Applicant: Tencent Technology (Shenzhen) Company Limited, Guangdong (CN)

(72) Inventors: Chucheng Chen, Guangdong (CN); Ruichen Wang, Guangdong (CN); Xiaoli Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 418 days.

(21) Appl. No.: 17/520,293

(22) Filed: Nov. 5, 2021

(65) Prior Publication Data

US 2022/0058396 A1  Feb. 24, 2022

Related U.S. Application Data

(63) Continuation of application No. PCT/CN2020/115772, filed on Sep. 17, 2020.

(30) Foreign Application Priority Data

Nov. 19, 2019 (CN) .......................... 201911134005.2

(51) Int. Cl.
*G06V 20/40* (2022.01)
*G06F 18/214* (2023.01)
(Continued)

(52) U.S. Cl.
CPC ............ *G06V 20/41* (2022.01); *G06F 18/214* (2023.01); *G06F 18/2415* (2023.01); *G06N 3/08* (2013.01); *G06V 20/46* (2022.01)

(58) Field of Classification Search
CPC ...... G06V 20/41; G06V 20/46; G06V 10/454; G06V 10/774; G06V 10/82; G06F 18/214;
(Continued)

(56) References Cited

U.S. PATENT DOCUMENTS 8,917,907 B2   12/2014   Wang et al.

FOREIGN PATENT DOCUMENTS

| CN | 108334861 A | 7/2018 |
| CN | 109255392 A | 1/2019 |

(Continued)

OTHER PUBLICATIONS

Wang, Chen, Xiao Bai, Lei Zhou, and Jun Zhou. "Hyperspectral image classification based on non-local neural networks." In IGARSS 2019—2019 IEEE International Geoscience and Remote Sensing Symposium, pp. 584-587. IEEE, 2019. (Year: 2019).*

(Continued)

*Primary Examiner* — Carol Wang
(74) *Attorney, Agent, or Firm* — Crowell & Moring LLP

(57) ABSTRACT

This application discloses a video classification model construction method and apparatus, a video classification method and apparatus, a device, and a medium. The method is performed by a computer device, and may include: obtaining training dataset, the training dataset including a plurality of video frames; inputting the training dataset into a to-be-trained classification model, the to-be-trained classification model including a plurality of convolutional layer groups and one output layer group, some of the convolutional layer groups including a non-local module; extracting long-distance dependency features of the plurality of video frames by using the non-local module, the long-distance dependency features being used to represent association relationships between spatial positions of the plurality of (Continued)

video frames; outputting the long-distance dependency features to the output layer group, to generate predicted classification results of the plurality of video frames; and training the to-be-trained classification model through a prediction loss function until a parameter in the to-be-trained classification model converges, to obtain a video classification model.

15 Claims, 7 Drawing Sheets

(51) Int. Cl.
  *G06F 18/2415* (2023.01)
  *G06N 3/08* (2023.01)
(58) Field of Classification Search
  CPC .............. G06F 18/2415; G06F 18/217; G06F 18/2413; G06N 3/08; G06N 3/045; G06N 3/048; G06N 3/047; Y02T 10/40
  See application file for complete search history.

(56) References Cited

FOREIGN PATENT DOCUMENTS

| | | | | | |
|---|---|---|---|---|---|
| CN | 109948425 | A | * | 6/2019 | |
| CN | 110032926 | A | | 7/2019 | |
| CN | 110070067 | A | | 7/2019 | |
| CN | 110084151 | A | * | 8/2019 | ......... G06K 9/00335 |
| CN | 110136703 | A | | 8/2019 | |
| CN | 110299152 | A | | 10/2019 | |
| CN | 110491370 | A | | 11/2019 | |
| CN | 110826462 | A | * | 2/2020 | ......... G06K 9/00335 |
| CN | 110929780 | A | | 3/2020 | |
| CN | 110956085 | A | * | 4/2020 | |
| CN | 110971685 | A | | 4/2020 | |
| CN | 111028166 | A | * | 4/2020 | ........... G06N 3/0454 |
| CN | 111598067 | A | * | 8/2020 | |
| WO | WO 02/089114 | A1 | | 11/2002 | |

OTHER PUBLICATIONS

Liu, Chih-Ting, Chih-Wei Wu, Yu-Chiang Frank Wang, and Shao-Yi Chien. "Spatially and temporally efficient non-local attention network for video-based person re-identification." arXiv preprint arXiv:1908.01683 (2019). (Year: 2019).*
International Search Report dated Dec. 2, 2020 for International Application No. PCT/CN2020/114352.
Written Opinion dated Dec. 2, 2020 for International Application No. PCT/CN2020/114352.
Office Action issued for corresponding application No. CN 201911134005.2 dated May 5, 2023, 12p, in Chinese language with Concise Explanation of Relavancy.
Bai, Lin et al.; "A CNN Accelerator on FPGA Using Depthwise Separable Convolution"; arXiv.org; XP055696933; Sep. 6, 2018; pp. 1-5.
Hu, Guyue et al.; "Joint Learning in the Spatio-Temporal and Frequency Domains for Skeleton-Based Action Recognition"; IEEE Transactions on Multimedia, vol. 22, No. 9; XP011806788; Nov. 12, 2019; pp. 2207-2220.
Kingma, D.P. et al.; "Adam: A Method for Stochastic Optimization"; XP055828333; retrieved from the Internet on Jul. 28, 2021 at https://arxiv.org/pdf/1412.6980.pdf; arXiv:1412.6980v9, Jan. 30, 2017; 15 pages.
Li, Ye et al.; "Spatiotemporal Feature Extraction for Pedestrian Re-identification"; Advances in Databases and Information Systems; [Lecture Notes in Computer Science]; Springer International Publishing, Cham, Switzerland; XP047511355; Jun. 21, 2019; pp. 188-200.
International Search Report and Written Opinion dated Dec. 29, 2020 for International Application No. PCT/CN2020/115772.
Extended European Search Report dated Jul. 19, 2022 for European Application No. 20889214.1.

* cited by examiner

VIDEO CLASSIFICATION MODEL CONSTRUCTION METHOD AND APPARATUS, VIDEO CLASSIFICATION METHOD AND APPARATUS, DEVICE, AND MEDIUM

RELATED APPLICATION

This application is a continuation of and claims priority to International PCT Application No. PCT/CN2020/115772, filed with the Chinese National Intellectual Property Administration on Sep. 17, 2020, which claims priority to Chinese Patent Application No. 201911134005.2, filed with the Chinese National Intellectual Property Administration on Nov. 19, 2019, both entitled "VIDEO CLASSIFICATION MODEL CONSTRUCTION METHOD AND APPARATUS, VIDEO CLASSIFICATION METHOD AND APPARATUS, DEVICE, AND MEDIUM". These applications are herein incorporated by reference in their entireties.

FIELD OF THE TECHNOLOGY

This application relates to the field of data processing technologies, specifically, to the field of video data processing technologies, and in particular, to a video classification model construction method and apparatus, a video classification method and apparatus, a device, and a medium.

BACKGROUND OF THE DISCLOSURE

At present, when a video is classified by using a three-dimensional convolutional neural network, a plurality of convolutional layers are generally disposed in the convolutional neural network. The convolutional layer obtains a feature in each video frame of a to-be-classified video, to obtain a feature map, and classifies the video based on the feature map.

It may be learned from the description that currently the feature map is obtained based on information about each pixel within each frame of image in the video frame, which limits richness of content information of the feature map between frames, resulting in less accurate classification.

SUMMARY

In view of a current problem that it is not easy t accurately classify a video with a collection of frames, this disclosure provides a video classification model construction method and apparatus, a video classification method and apparatus, a device, and a medium, so that a constructed video classification model can improve the accuracy of video classification.

According to a first aspect, an embodiment of this disclosure provides a video classification model construction method, performed by a computer device, the method including:

obtaining training dataset, the training dataset including a plurality of video frames;

inputting the training dataset into a to-be-trained classification model, the to-be-trained classification model including a plurality of convolutional layer groups and one output layer group, some of the convolutional layer groups including a non-local module;

extracting long-distance dependency features of the plurality of video frames by using the non-local module, the long-distance dependency features being used for representing association relationships between spatial positions included in the plurality of video frames;

outputting the long-distance dependency features to the output layer group, to output predicted classification results of the plurality of video frames; and training the to-be-trained classification model through a prediction loss function until a parameter in the to-be-trained classification model converges, to obtain a video classification model.

According to a second aspect, an embodiment of this disclosure provides a video classification method, performed by a computer device, the method including:

obtaining a to-be-classified video;

obtaining a plurality of video frames from the video according to a preset temporal position;

inputting the plurality of video frames into a pre-trained video classification model, and outputting at least one classification label of the plurality of video frames, the video classification model being obtained through training by using the video classification model construction method according to the first aspect; and identifying a category of the video according to the at least one classification label of the plurality of video frames.

According to a third aspect, an embodiment of this disclosure provides a video classification model construction apparatus, including:

a first obtaining module, configured to obtain training dataset, the training dataset including a plurality of video frames;

an input module, configured to input the training dataset into a to-be-trained classification model, the to-be-trained classification model including a plurality of convolutional layer groups and one output layer group, some of the convolutional layer groups including a non-local module;

an extraction module, configured to extract long-distance dependent features of the plurality of video frames by using the non-local module, the long-distance dependent features being used for representing association relationships between spatial positions included in the plurality of video frames;

an output module, configured to output the long-distance dependency features to the output layer group, to output predicted classification results of the plurality of video frames; and a training module, configured to train the to-be-trained classification model through a prediction loss function until a parameter in the to-be-trained classification model converges, to obtain a video classification model.

According to a fourth aspect, an embodiment of this disclosure provides a video classification apparatus, including:

a second obtaining module, configured to obtain a to-be-classified video;

a third obtaining module, configured to obtain a plurality of video frames from the video according to a preset temporal position;

an input and output module, configured to: input the plurality of video frames into a pre-trained video classification model, and output at least one classification label of the plurality of video frames, the video classification model being obtained through training by using the video classification model construction apparatus according to the third aspect; and an identification module, configured to identify a category of the video according to the at least one classification label of the plurality of video frames.

According to a fifth aspect, an embodiment of the present disclosure provides a computer device, including:
one or more processors; and
a memory, configured to store one or more programs, the one or more programs, when executed by the one or more processors, causing the one or more processors to implement the methods according to the first aspect and the second aspect.

According to a sixth aspect, an embodiment of this disclosure provides a computer-readable storage medium, storing a computer program, the computer program, when executed by a processor, implementing the methods according to the first aspect and the second aspect.

BRIEF DESCRIPTION OF THE DRAWINGS

To describe the technical solutions in the embodiments of this disclosure more clearly, the following briefly describes the accompanying drawings illustrating the embodiments of this disclosure or in the related art. Apparently, the accompanying drawings are merely used as examples and are not intended to constitute a limitation on this disclosure. In addition, for ease of description, the accompanying drawings only show parts relevant to this disclosure rather than entire structures.

DESCRIPTION OF EMBODIMENTS

This disclosure is further described in detail below with reference to the accompanying drawings and embodiments. It may be understood that specific embodiments described herein are only used to explain the relevant principles of this disclosure, but not to limit the scope of this disclosure. In addition, for ease of description, the accompanying drawings only show parts relevant to this disclosure.

The embodiments in this disclosure and the features in the embodiments may be combined with each other in case of no conflicts. This disclosure is described in detail below with reference to the accompanying drawings and the embodiments.

Figure 1:
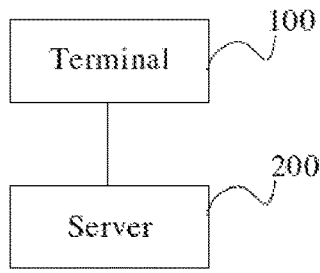
FIG. 1 is an example architectural diagram of an implementation environment for video classification model construction and video classification according to an embodiment of this disclosure.

FIG. 1 is an architectural diagram of an implementation environment for video classification model construction and video classification according to an embodiment of this disclosure. As shown in FIG. 1, an architecture of the implementation environment may include a terminal 100 and a server 200.

A video classification model construction apparatus may be the terminal 100 or the server 200. The terminal 100 or the server 200 obtains a video in a video database, and trains, optimizes, and tests a to-be-trained video classification model, to construct a video classification model.

A process of video classification may be performed either on the terminal 100 or on the server 200. The terminal 100 receives a to-be-classified video and performs corresponding preprocessing on the to-be-classified video. Further, when the video classification is performed on the terminal 100, the terminal 100 directly inputs the to-be-classified video into the video classification model to classify the video. When the video classification is performed on the server 200, the terminal 100 transmits the preprocessed to-be-classified video to the server 200, and the server 200 receives the preprocessed to-be-classified video, and inputs the to-be-classified video into the video classification model to classify the to-be-classified video.

The to-be-classified video may be a short video.

In addition, the terminal 100 may display an application interface. Through the interface, a to-be-classified video uploaded by a user may be obtained or an uploaded to-be-classified video may be transmitted to the server 200.

The type of the terminal 100 may include but is not limited to a smartphone, a tablet computer, a television, a notebook computer, or a desktop computer. This is not specifically limited in this embodiment of this disclosure.

The server 200 may transmit a classification result to the terminal 100, for the terminal 100 to display the classification result on the application interface. Further, the server 200 may be one server, a server cluster including a plurality of servers, or a cloud computing service center.

The terminal 100 and the server 200 may establish a communication connection through a wired or wireless network.

Figure 2:
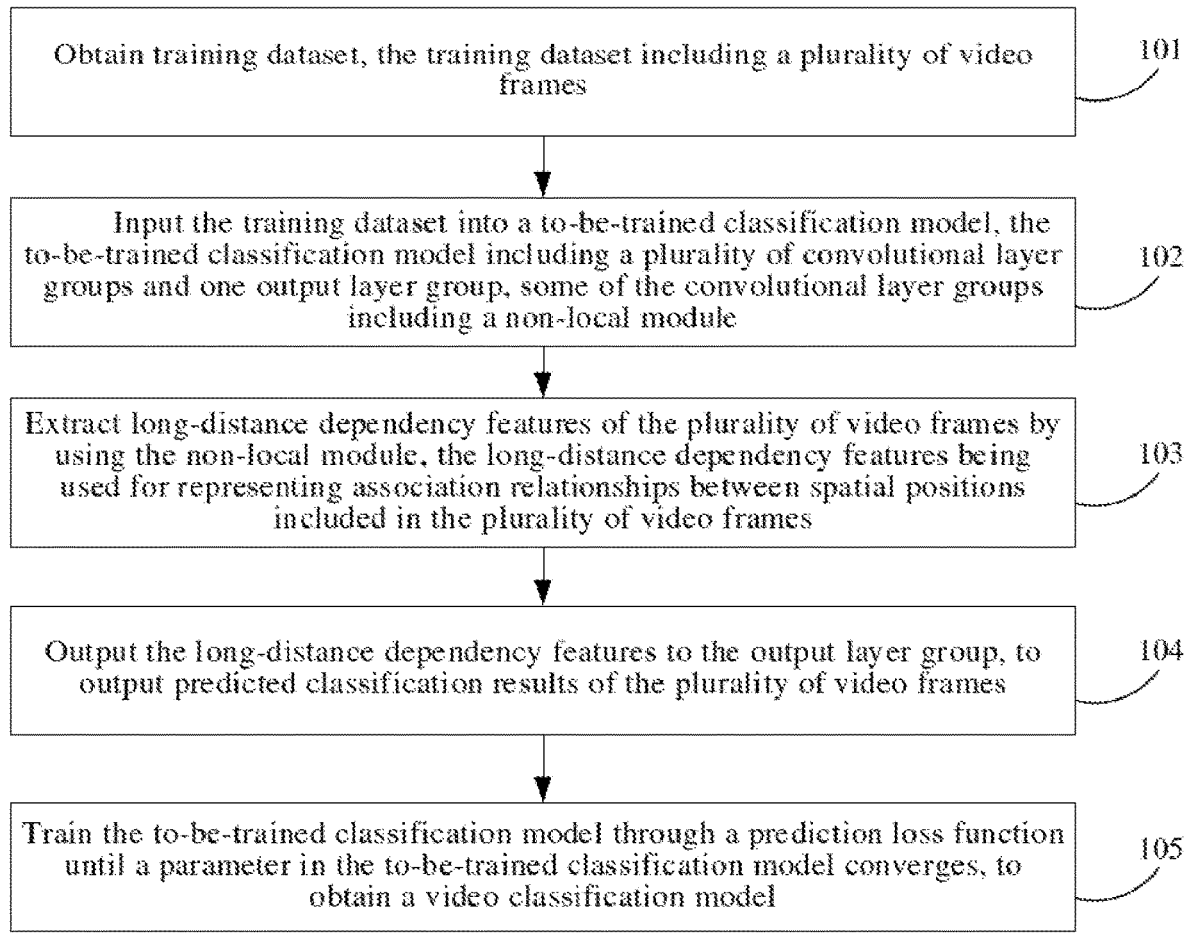
FIG. 2 is an example flowchart of a video classification model construction method according to an embodiment of this disclosure.

FIG. 2 is a flowchart of a video classification model construction method according to an embodiment of this disclosure. As shown in FIG. 2, the method is performed by a video classification model construction apparatus, and the video classification model construction apparatus is an execution entity. The video classification model construction apparatus may be integrated in a computer device such as a server or a terminal. Therefore, the computer device shown in FIG. 11 may also be used as the execution entity of the method shown in FIG. 2. The video classification model construction apparatus may be hardware or may be a software module. This solution may be performed by a single terminal or server or by a combination thereof.

The method may include the following steps:

Step 101: Obtain training dataset, the training dataset including a plurality of video frames.

The training dataset may be obtained from an existing video database such as a Kinetics video database.

Each video in the video database may be determined as a training sample, and training dataset is obtained after the training sample is processed accordingly.

Figure 3:
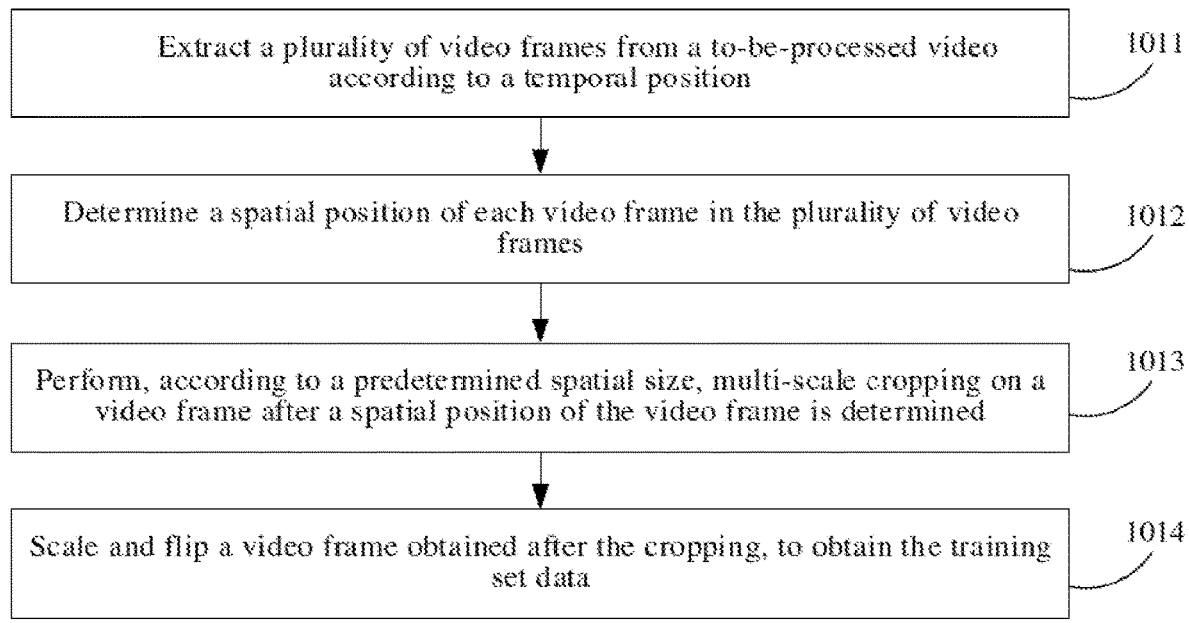
FIG. 3 is an example flowchart of a method for obtaining training dataset according to an embodiment of this disclosure.

Referring to FIG. 3, for each training sample, the training dataset may be obtained through the following steps:

Step 1011: Extract a plurality of video frames from a to-be-processed video according to a temporal position.

The to-be-processed video is a training sample selected for obtaining training dataset.

Step 1011 may be: randomly determining a temporal position in the to-be-processed video, and extracting several frames of images around the determined temporal position, to obtain the plurality of video frames. Further, when the length of the to-be-processed video is not enough to extract the plurality of video frames, the plurality of video frames may be obtained through a loop operation.

A quantity of frames of the plurality of video frames may be a fixed quantity of frames, for example, 16, or may be a quantity of frames that is determined according to actual situations. For example, when the to-be-processed video is longer, more video frames may be obtained, and when the to-be-processed video is shorter, fewer video frames may be obtained.

Step 1012: Determine a spatial position of each video frame in the plurality of video frames.

Step 1013: Perform, according to a predetermined spatial size, multi-scale cropping on a video frame after a spatial position of the video frame is determined.

The generalization of a to-be-trained sample can be enhanced by performing the multi-scale cropping on the video frame, so as to improve classification performance of a to-be-trained classification model.

During training, different types of cropping may be performed on different video frames. For example, a video frame is cropped by randomly selecting four corner points or one center point of the video frame as a reference, or a video frame is cropped by selecting a spatial size. For example, the selected size is as follows:

$$\left\{1, \frac{1}{2^{1/4}}, \frac{1}{\sqrt{2}}, \frac{1}{2^{3/4}}, \frac{1}{2}\right\}$$

The size of 1 indicates that the width and height of a video frame obtained after a video frame is cropped are both the same as the size of a short side of the video frame before cropping. The size of 0.5 indicates that the width and height of a video frame obtained after a video frame is cropped are both half of the size of a short side of the video frame before cropping. Other values are analogous to the above forms.

When multi-scale cropping is performed on video frame data, each video frame is cropped by using only one scale. After the plurality of video frames are cropped by using different scales, a plurality of video frames with different cropping scales are obtained, thereby obtaining generalized video frames.

Step 1014: Scale and flip a video frame obtained after the cropping, to obtain the training dataset.

After the video frame is cropped in step 1013, video frames obtained after cropping may have different sizes. Therefore, all video frames obtained after cropping need to be scaled to the same preset size to facilitate the processing of the plurality of video frames by the to-be-trained classification model, for example, scaled to 112*112.

After being scaled to the preset size, the video frames may further be flipped according to a preset flipping probability, for example, flipped horizontally, to further enhance data and improve the generalization of the training sample.

The preset flipping probability may be any probability set as required. For example, the flipping probability is 0.5.

Step 102: Input the training dataset into a to-be-trained classification model, the to-be-trained classification model including a plurality of convolutional layer groups and one output layer group, some of the convolutional layer groups including a non-local module.

Figure 4:
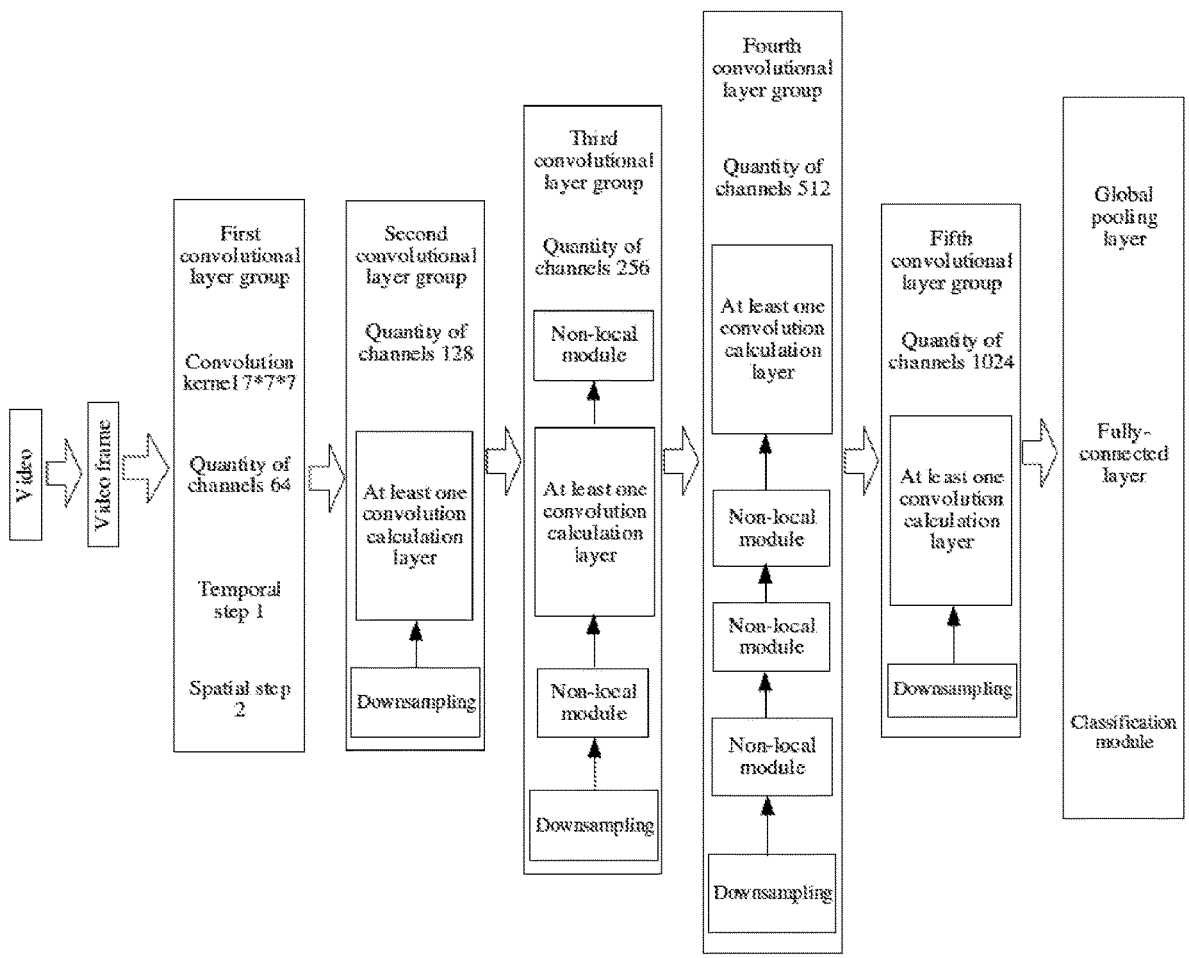
FIG. 4 is an example schematic structural diagram of a to-be-trained classification model according to an embodiment of this disclosure.

Referring to FIG. 4, the plurality of convolutional layer groups are five convolutional layer groups, which are a first convolutional layer group, a second convolutional layer group, a third convolutional layer group, a fourth convolutional layer group, and a fifth convolutional layer group in sequence in an input and output order. The third convolutional layer group and the fourth convolutional layer group include a non-local module. The non-local module may be further arranged in another convolutional layer group. The third convolutional layer group and the fourth convolutional layer group are only used as an example herein.

The non-local module may be defined by using the following method. Assuming that X is a video frame inputted into the non-local module and Xi is a parameter (of a single pixel) in a specific video frame, the non-local module may determine a weight of an association relationship between parameters included in all video frames inputted into the non-local module and Xi, and the weight is used as a response at a position of Xi. Further, responses of the parameters included in all the video frames are used as outputs of the non-local module, and the "parameters included in all video frames inputted into the non-local module" herein include spatial parameters, temporal parameters, and spatiotemporal parameters. Therefore, the non-local module is configured to extract long-distance dependency features of the plurality of video frames, and the long-distance dependency features are used for representing association relationships between spatial positions included in the plurality of video frames.

The first convolutional layer group may include a convolution calculation layer with a convolution kernel size of 7*7*7, a quantity of output channels of 64, a step size of 1 in a temporal dimension, and a step size of 2 in a spatial dimension.

The second convolutional layer group, the third convolutional layer group, the fourth convolutional layer group, and the fifth convolutional layer group include at least one convolution calculation layer. Convolution kernel sizes of the second convolutional layer group, the third convolutional layer group, the fourth convolutional layer group, and the fifth convolutional layer group are determined according to specific convolution calculation layers included therein. The convolution calculation layer may be a bottleneck module, which is not specifically limited. Example implementations of the bottleneck module is included in this disclosure below.

A quantity of channels of the second convolutional layer group is 128, a quantity of channels of the third convolutional layer group is 256, a quantity of channels of the fourth convolutional layer group is 512, and a quantity of channels of the fifth convolutional layer group is 1024.

Maximum pooling layer down-sampling with a size of 3*3*3, a step size of 2 in a temporal dimension, and a step size of 2 in a spatial dimension is included in the front of the second convolutional layer group.

Maximum pooling layer down-sampling with a size of 2*2*2, a step size of 2 in a temporal dimension, and a step size of 2 in a spatial dimension is included in the front of each of the third convolutional layer group, the fourth convolutional layer group, and the fifth convolutional layer group.

Further, still referring to FIG. 4, the output layer group sequentially may include a global pooling layer and a fully-connected layer in an input and output order. That is, a feature map outputted from the fifth convolutional layer group is inputted into the global pooling layer, and then inputted into the fully-connected layer.

Further, the output layer group of the to-be-trained classification model may further include a classification module. The classification module is configured to: receive an output of the fully-connected layer as an input of the classification module, calculate, according to the input, a probability value that the training dataset belongs to each video type, and determine the training dataset as at least one video type according to the probability value.

Each convolutional layer group included in the to-be-trained classification model may include at least one bottleneck module, and the bottleneck module and the non-local module are alternately arranged in a case that the bottleneck module and the non-local module are in the same convolutional layer group.

In some example implementations, no bottleneck module is arranged in the first convolutional layer group, and there may be, for example, three bottleneck modules in the second convolutional layer group, four bottleneck modules in the third convolutional layer group, six bottleneck modules in the fourth convolutional layer group, and three bottleneck modules in the fifth convolutional layer group.

Each bottleneck module may include a preset quantity of convolution calculation layers, and at least one convolution calculation layer is a depthwise separable convolution calculation layer. The depthwise separable convolution is used to reduce a quantity of parameters of convolution calculation while keeping performance of a convolution calculation result unchanged, so as to reduce a calculation burden.

For example, each bottleneck module may include three convolution calculation layers, namely, a first convolution calculation layer, a second convolution calculation layer, and a third convolution calculation layer. The first convolution calculation layer and the third convolution calculation layer may include convolution calculation layers with a convolution kernel size of 1*1*1, and the second convolution calculation layer may be a depthwise separable convolution calculation layer.

After being outputted from the convolution calculation layers, the feature map is inputted into a batch normalization layer and a rectified linear unit (ReLU) activation function layer, and normalization operations and ReLU activation operations are respectively performed on the feature map.

The depthwise separable convolution calculation may include the following steps:

Step 1: Perform convolution calculation in which a convolution kernel size is 3*3*3 on each channel of the inputted feature map, to obtain a feature map of each channel.

This step may include: determining a quantity of channels of the feature map, decomposing the feature map according to the channels, splitting the feature map into the quantity of channels, and performing convolution calculation in which a convolution kernel size is 3*3*3, a quantity of input channels is 1, and a quantity of output channels is 1 on each split channel feature map, to obtain a channel quantity of new channel feature maps.

For example, the size of the feature map is N*H*W*C1, where N represents the size of a temporal dimension, H*W represents the size of a spatial dimension, and C1 represents a quantity of input channels. The feature map is split into C1 channel feature maps, and the convolution calculation in which the convolution kernel size is 3*3*3, the quantity of input channels is 1, and the quantity of output channels is 1 is performed on the C1 channel feature maps, to obtain the channel quantity of new channel feature maps.

Step 2: Merge all the new channel feature maps to obtain a merged feature map.

For example, the foregoing example is still used as an example. The C1 channel feature maps are merged to obtain a merged feature map.

Step 3: Perform convolution calculation in which a convolution kernel size is 1*1*1 on the merged feature map, to obtain an output of the depthwise separable convolution calculation layer.

Step 1023 may be: performing convolution calculation in which a convolution kernel size is 1*1*1, a quantity of input channels is C1, and a quantity of output channels is C2 on the merged feature map.

Compared with conventional convolution calculation, the depthwise separable convolution calculation used herein can greatly reduce the calculation burden. For example, for a feature map with a size of N*H*W*C1, convolution calculation in which a convolution kernel size is 3*3*3 and a quantity of output channels is C2 is performed, and a quantity of parameters calculated through the convolution calculation is C1*3*3*3*C2. However, if the depthwise separable convolution calculation is performed, a quantity of parameters included is C1*3*3*3+C1*1*1*1*C2, which is significantly smaller than C1*3*3*3*C2. Therefore, the depthwise separable convolution calculation can greatly reduce the calculation burden.

When a convolutional layer group may include bottleneck modules and non-local modules that are arranged at an interval, specific positions of the bottleneck modules and non-local modules arranged at an interval may be determined according to a quantity of the bottleneck modules and the non-local modules, which are not specifically limited.

Figure 5:
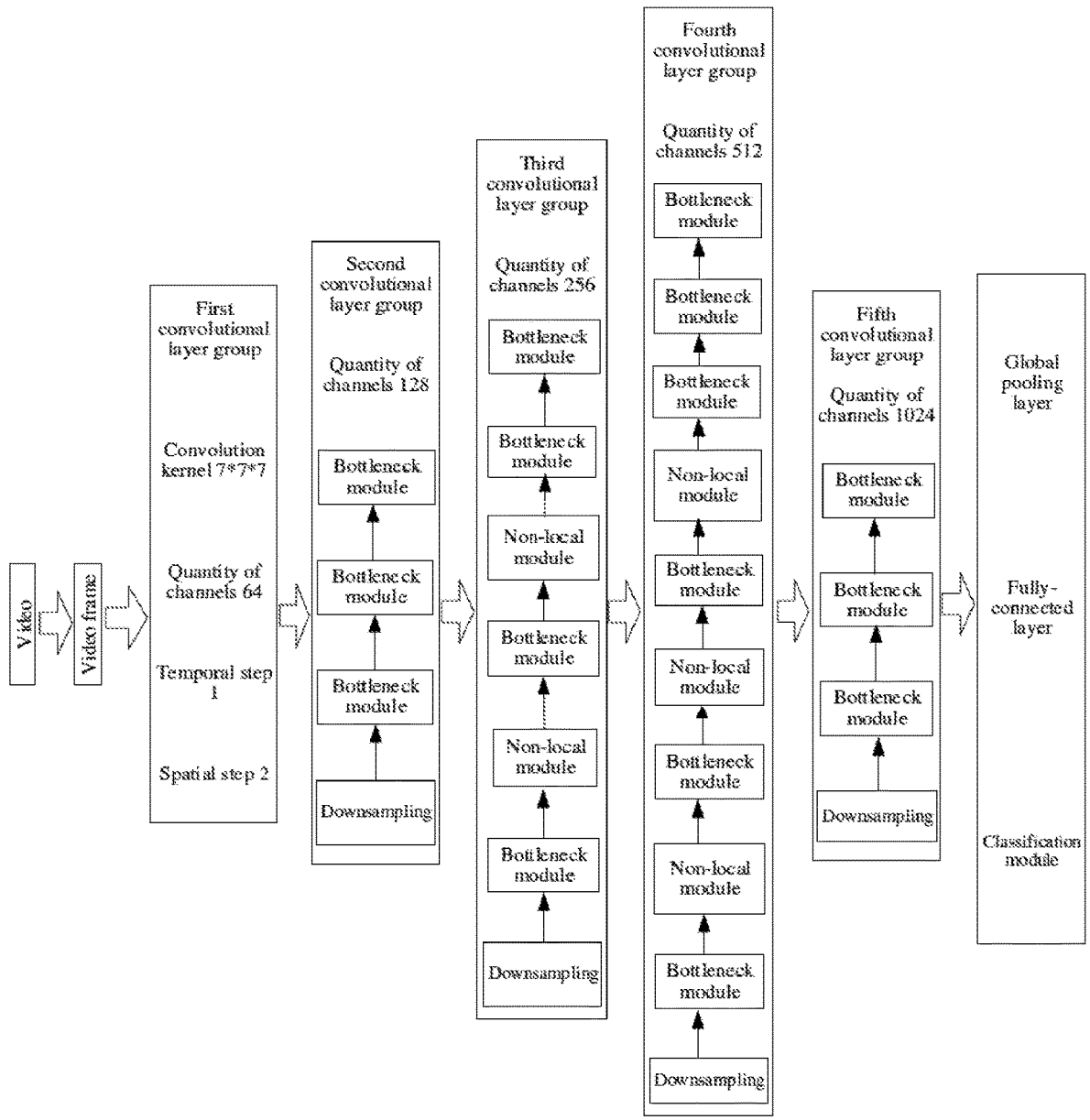
FIG. 5 is an example schematic structural diagram of another to-be-trained classification model according to an embodiment of this disclosure.

For example, when the third convolutional layer group and the fourth convolutional layer group include the bottleneck modules and the non-local modules that are arranged at an interval, and there are four bottleneck modules and two non-local modules in the third convolutional layer group and there are six bottleneck modules and three non-local modules in the fourth convolutional layer group, the two non-local modules in the third convolutional layer group may be arranged at any two of the positions between the first bottleneck module and the second bottleneck module, between the second bottleneck module and the third bottleneck module, and between the third bottleneck module and the fourth bottleneck module. For example, in FIG. 5, the two non-local modules in the third convolutional layer group are respectively arranged between the first bottleneck module and the second bottleneck module and between the second bottleneck module and the third bottleneck module.

Figures 6, 7:
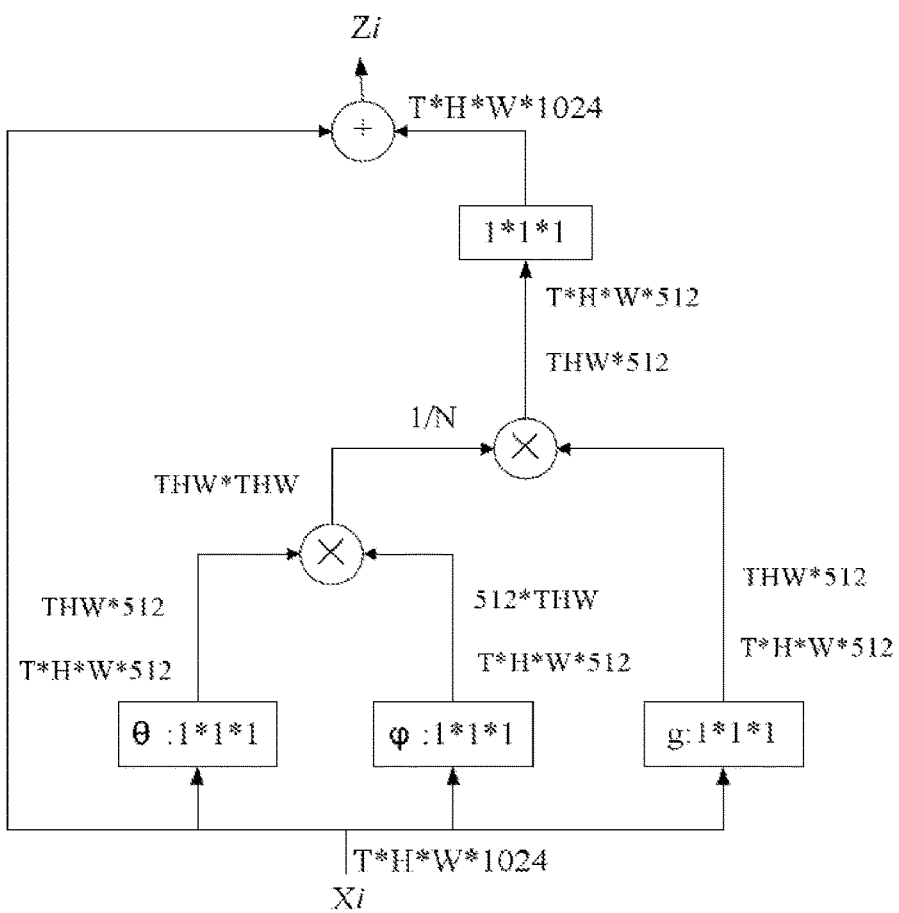
FIG. 6 is an example flowchart of a method for extracting a feature map according to an embodiment of this disclosure.
FIG. 7 is an example diagram of a network structure of a non-local module according to an embodiment of this disclosure.

Further, referring to FIG. 6, when a convolutional layer group may include a bottleneck module and a non-local module that are arranged at an interval, the to-be-trained classification model performs the following processing steps on the plurality of video frames to obtain a feature map group.

Step 1021: Perform depthwise separable convolution on feature maps corresponding to the plurality of video frames by using the bottleneck module, and perform channel doubling on the feature maps obtained after the depthwise separable convolution, to obtain a first feature map group.

The channel doubling refers to changing a quantity of channels to several times the quantity of original channels, generally an integer multiple, to improve the effect of convolution calculation, thereby improving classification performance of the to-be-trained classification model.

Compared with a general convolution calculation layer, in this embodiment of this disclosure, the quantity of channels of the feature map is increased, the classification performance is improved, and a quantity of parameters is reduced by using depthwise separable convolution calculation. Therefore, this method improves the classification performance without increasing the quantity of parameters.

Step 1022: Input the first feature map group into the non-local module, and calculate, by the non-local module, correspondences between spatial positions included in each feature map as long-distance dependency features, to output a second feature map group including the long-distance dependency features.

Step 103: Extract long-distance dependency features of the plurality of video frames by using the non-local module, the long-distance dependency features being used for representing association relationships between spatial positions included in the plurality of video frames.

The long-distance dependency features may be association relationships between different pixels in the same feature map, or the association relationships between different feature maps.

In this embodiment of this disclosure, a non-local module is defined by using the following Formula (1):

$$Z_i = W_z Y + X_i \quad (1)$$

where $Z_i$ represents an output of the non-local module, $X_i$ represents an input of the non-local module, which may be a pixel on a feature map, $W_z$ is a coefficient, which may be initialized randomly, and $Y_i$ is used for establishing an association relationship between the pixel $X_i$ and a pixel related to $X_i$ in the feature map. $Y_i$ is calculated by using the following Formula (2):

$$Y_i = \frac{1}{C(x)} \sum_{\forall j} f(X_i, X_j) g(X_j) \quad (2)$$

where $C(x)$ is a normalization parameter, $C(x)$ in this embodiment of this disclosure is equal to N, and N represents a quantity of positions related to $X_i$, g(Xj) is used for calculating a feature value of an input signal at a position j, and f(Xi, Xj) is used for calculating a degree of association between a position i and the position j. For example, if a distance between i and j is farther, the value off is smaller, indicating that the position j has less impact on position i.

Further, f(Xi, Xj) may be calculated by using the following Formula (3):

$$f(X_i, X_j) = \theta(X_i)^T \phi(X_j) \quad (3)$$

where θ represents performing convolution calculation with a convolution kernel of 1*1*1 on the inputted $X_i$, and φ represents performing convolution calculation with a convolution kernel of 1*1*1 on the inputted Xj.

Further, a network structure of the non-local module is shown in FIG. 7. An input is T*H*W*1024, where T represents a temporal dimension, H*W represents a spatial dimension, and 1024 represents a quantity of channels of an inputted feature map.

Because the non-local module can obtain a long-distance dependency feature of the feature map, compared with the current method of using stacked convolution calculations to obtain surrounding information, the non-local module can improve the classification performance of the classification model.

Step 104: Output the long-distance dependency features to the output layer group, to output predicted classification results of the plurality of video frames.

When the to-be-trained classification model may further include the bottleneck module, content of the feature map outputted to an output layer further may include features extracted by the bottleneck module.

Step 105: Train the to-be-trained classification model through a prediction loss function until a parameter in the to-be-trained classification model converges, to obtain a video classification model.

The prediction loss function may be represented by the following Formula (4):

$$L = \begin{cases} -(1-y')^\gamma \log y' & y = 1 \\ -y'^\gamma \log(1-y') & y = 0 \end{cases} \quad (4)$$

Formula (4) is an improved cross-entropy loss function, where y=1 represents that a training sample is a positive sample, and y=0 represents that a training sample is a negative sample.

y' represents that a value range of a probability value outputted by the to-be-trained classification model is greater than or equal to 0 and less than or equal to 1 in a case that a training sample is a positive sample.

y is a value set according to actual situations, for example, set to 0.5, 1, or 2.

An existing cross-entropy loss function is represented by the following Formula (5):

$$L = \begin{cases} -\log y' & y = 1 \\ -\log(1-y') & y = 0 \end{cases} \quad (5)$$

It may be seen from Formula (4) and Formula (5) that compared with calculating a loss value by using Formula (5), calculating the loss value by using Formula (4) may reduce loss of a sample that is easy to be classified. In this way, the loss value of the model contributed by a large quantity of samples that are easy to be classified is avoided, thereby raising concerns of the model about samples that are difficult to be classified.

For example, when y is equal to 2, for a positive sample, if a prediction result is 0.9, the positive sample is considered to be a simple that is easy to be classified, and loss of the positive sample obtained by using Formula (4) is 0.01 times loss of an ordinary cross-entropy loss function. If the prediction result is 0.1, the positive sample is considered to be a sample that is difficult to be classified, and the loss of the positive sample obtained by using Formula (4) is 0.81 times loss of an ordinary cross-entropy loss function. It may be seen that when calculating the loss value by using Formula (4), for the sample that is easy to be classified, the loss is higher, and for the sample that is difficult to be classified, the loss is lower. In this way, the loss value of the to-be-trained classification module provided by the large quantity of samples that are easy to be classified is avoided, thereby raising concerns of the model about samples that are difficult to be classified.

In addition, during training, the improved cross-entropy loss function is used. For acquisition of a pre-trained model, a stochastic gradient algorithm is used for optimization. A momentum is set to 0.9, a weight decay is set to 0.001, a learning rate is initialized to 0.1, and a total of 150 rounds of iterations are set. Meanwhile, if loss of a training set does not decrease in 10 consecutive iterations, the learning rate is reduced by 10 times, and the learning rate is reduced by 10 times only twice. That is, if the loss of the training set does not decrease in 10 consecutive iterations for the third time, the learning rate remains unchanged and is no longer reduced by 10 times. When the model is fine-tuned, an initial learning rate is 0.001, the weight decay is 0.00001, and other conditions are the same as those of training the pre-trained model.

After training, the to-be-trained classification model further needs to be tested. A test process is as follows:

For a to-be-tested video, a plurality of groups of test samples are generated in a sliding window manner. For example, five groups of test samples are generated. Each test sample may include several frames of images. For example, each test sample may include 16 frames of images. For each group of test samples, the test samples are inputted into a to-be-tested model, for the to-be-tested model to output probability values that the groups of test samples belong to video types, the probability values of the video type are averaged to obtain an average probability value, and a video type corresponding to a maximum average probability value is used as a video type to which the to-be-tested video belongs.

In addition, the foregoing Kinetics video database may include 400 video types with a total of 300,000 video clips, which is a relatively large video database. The to-be-trained classification model is trained by using the video database, to obtain a video classification model with better performance. However, there is still an error in the video classification model in this case for another specific video dataset. Therefore, when using the video classification model, the video classification model needs to be retrained on the specific video dataset, to fine-tune the video classification model, and obtain a classification model suitable for a feature of the video dataset. The specific video dataset may be a part of a video set that needs to be classified, for example, may be a video dataset corresponding to application software. In this way, after being fine-tuned by using the video dataset of the application software, the video classification model can classify other videos of the application software.

In the video classification model construction method provided in the embodiments of this disclosure, the non-local module is arranged in a three-dimensional convolutional neural network, and the non-local module is used to obtain the long-distance dependency feature. Compared with performing video classification depending on a feature map after the feature map is extracted by using a plurality of convolutional layers currently, in the embodiments of this disclosure, correlations between different pixels or between different feature maps may be obtained, which enriches content of the feature map, thereby improving the accuracy of video classification.

In addition, in the video classification model construction method provided in the embodiments of this disclosure, some of the convolution calculation layers in the bottleneck module are replaced by depthwise separable convolution calculation layers to reduce a quantity of parameters, reduce a calculation burden during classification, and improve efficiency of video classification.

In addition, in the video classification model construction method provided in the embodiments of this disclosure, the quantity of channels of the feature map is appropriately increased to improve performance of feature extraction of the feature map, thereby improving the classification performance of the classification model.

In addition, in the video classification model construction method provided in the embodiments of this disclosure, a loss function in a training stage of the classification model is also improved. By adding hyperparameters, the loss value of the model is prevented from being contributed by a large quantity of samples that are easy to be classified, thereby raising the concerns of the model about samples that are difficult to be classified.

Figure 8:
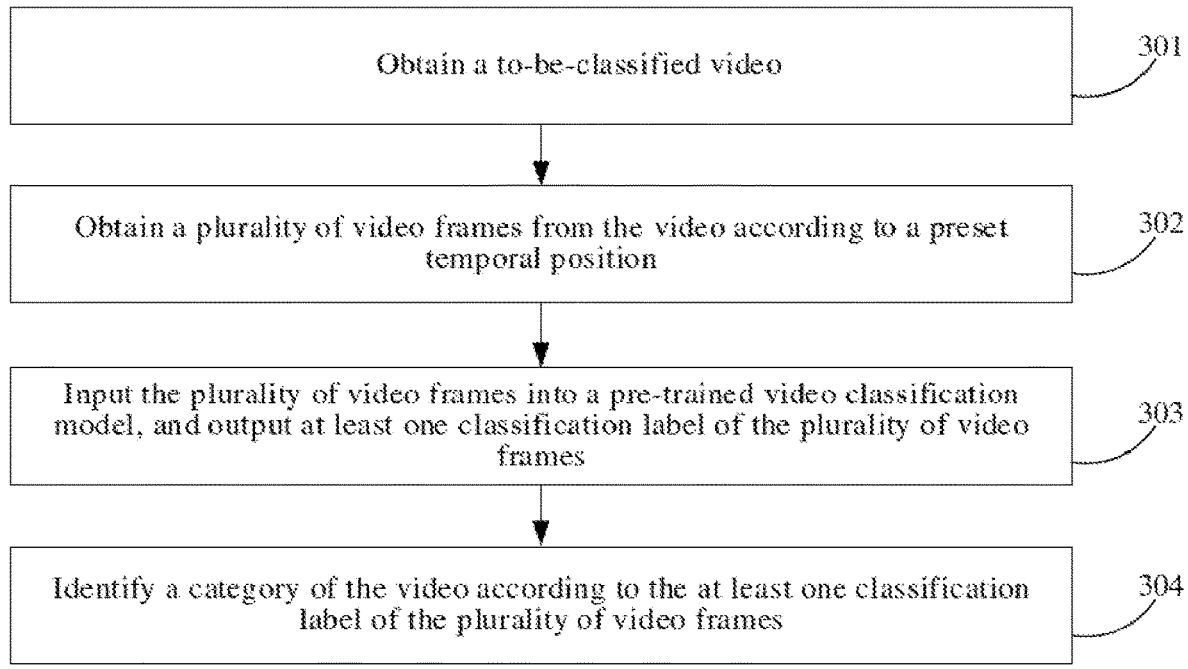
FIG. 8 is an example flowchart of another video classification method according to an embodiment of this disclosure.

FIG. 8 is a flowchart of a video classification method according to an embodiment of this disclosure. The method shown in FIG. 8 may be performed by a video classification apparatus, and the video classification apparatus is an execution entity. The video classification apparatus may be integrated in a computer device such as a server or a terminal, and may be hardware or may be a software module. This solution can be performed by a single terminal or server, or by a combination thereof. As shown in FIG. 8, the method may include the following steps:

Step 301: Obtain a to-be-classified video.

Step 302: Obtain a plurality of video frames from the video according to a preset temporal position.

Video frame data may be obtained by using the following method: obtaining the to-be-classified video; and obtaining several frames of images from the to-be-classified video according to a preset method to obtain the video frame data.

The preset method may be randomly obtaining several frames of images from the to-be-classified video. Further, the randomly obtaining several frames of images may include: randomly determining a temporal position in the to-be-classified video, and obtaining several frames of images around the temporal position, to obtain the video frame data. Further, when the length of the to-be-classified video is not enough to obtain the several frames of images, the several frames of images may be obtained through a loop operation.

A quantity of frames of the several frames of images may be a fixed quantity of frames, for example, 16, or may be a quantity of frames that is determined according to actual situations. For example, when the video is longer, more frames of images may be obtained, and when the video is shorter, fewer frames of images may be obtained.

Step 303: Input the plurality of video frames into a pre-trained video classification model, and output at least one classification label of the plurality of video frames.

The pre-trained video classification model is a three-dimensional convolutional neural network. Further, a feature map of the video frame data is obtained by using the three-dimensional convolutional neural network, and the to-be-classified video is classified according to the feature map.

In a classification result, the to-be-classified video can belong to only one video type.

Alternatively, the to-be-classified video may belong to one video type or a plurality of video types.

Further, the classification result may be determined according to a probability that the to-be-classified video belongs to each video type. Further, in the classification result, when the to-be-classified video can belong to only one specific video type, a video type corresponding to the highest probability is determined as the video type to which the to-be-classified video belongs. Further, when the to-be-classified video may belong to one video type or a plurality of video types, if a probability that the to-be-classified video belongs to a specific video type is significantly higher than a probability that the to-be-classified video belongs to another video type, it is determined that the to-be-classified video belongs to the specific video type. When probabilities that the to-be-classified video belongs to a plurality of video types are basically the same, and are significantly higher than a probability that the to-be-classified video belongs to another video type, it is determined that the to-be-classified video belongs to the plurality of video types.

For example, there are five video types 1, 2, 3, 4, and 5. When a pre-trained classification module calculates that probability values that the to-be-classified video belongs to the video types are [0.1, 0.35, 0.05, 0.05, 0.45], the pre-trained classification module determines that the to-be-classified video is classified as the fifth video type. When the calculated probability values are [0.1, 0.35, 0.05, 0.15, 0.35], the pre-trained classification module determines that the to-be-classified video is classified as the second video type and fifth video type.

In addition, the video classification model is obtained through training by using any video classification model construction method shown in FIG. 2 and FIG. 3.

Step 304: Identify a category of the video according to the at least one classification label of the plurality of video frames.

In conclusion, in the video classification method provided in the embodiments of this disclosure, the non-local module is arranged in a three-dimensional convolutional neural network, and the non-local module is used to obtain the long-distance dependency feature. Compared with performing video classification depending on a feature map after the feature map is extracted by using a plurality of convolutional layers currently, in the embodiments of this disclosure, correlations between different pixels or between different feature maps may be obtained, thereby improving the accuracy of video classification.

In addition, in the video classification method provided in the embodiments of this disclosure, some of the convolution calculation layers in the bottleneck module are replaced by depthwise separable convolution calculation layers to reduce a quantity of parameters, reduce a calculation burden during classification, and improve efficiency of video classification.

In addition, in the video classification method provided in the embodiments of this disclosure, the quantity of channels of the feature map is appropriately increased to improve performance of feature extraction of the feature map, thereby improving the classification performance of the classification model.

In addition, in the video classification method provided in the embodiments of this disclosure, a loss function in a training stage of the classification model is also improved. By adding hyperparameters, the loss value of the model is prevented from being contributed by a large quantity of samples that are easy to be classified, thereby raising the concerns of the model about samples that are difficult to be classified.

The embodiments in this specification are all described in a progressive manner, and similar parts among the embodiments may be mutually referenced. The embodiment under each step focuses on the specific method under the step. The foregoing described implementations are merely examples, and specific embodiments are merely exemplary description of this disclosure. A person skilled in the art to which this disclosure belongs may make several improvements and refinements without departing from the principle described in the embodiments of this disclosure, and the improvements shall fall within the protection scope of this disclosure.

Figure 9:
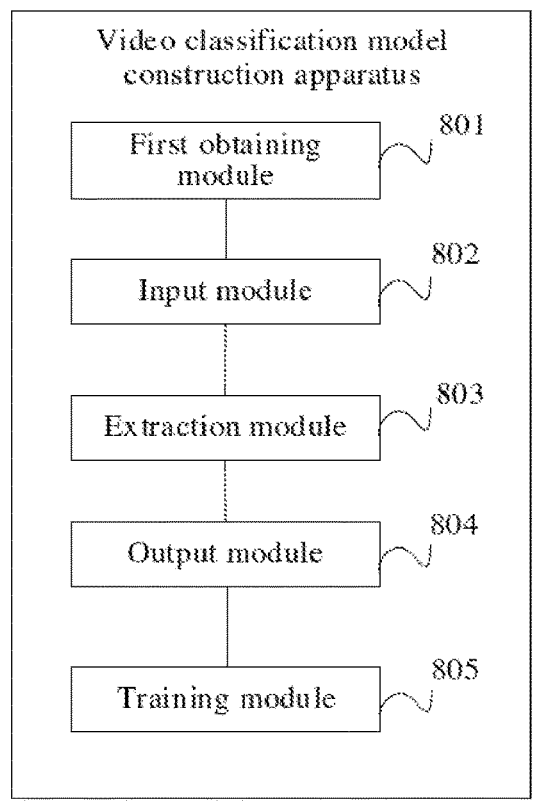
FIG. 9 is an example block diagram of a video classification model construction apparatus according to an embodiment of this disclosure.

FIG. 9 is a block diagram of a video classification model construction apparatus according to an embodiment of this disclosure. The apparatus shown in FIG. 9 may be disposed on a terminal. As shown in FIG. 9, the apparatus may include:

a first obtaining module 801, configured to obtain training dataset, the training dataset including a plurality of video frames;

an input module 802, configured to input the training dataset into a to-be-trained classification model, the to-be-trained classification model including a plurality of convolutional layer groups and one output layer group, some of the convolutional layer groups including a non-local module;

an extraction module 803, configured to extract long-distance dependent features of the plurality of video frames by using the non-local module, the long-distance dependent features being used for representing association relationships between spatial positions included in the plurality of video frames;

an output module 804, configured to output the long-distance dependency features to the output layer group, to output predicted classification results of the plurality of video frames; and a training module 805, configured to train the to-be-trained classification model through a prediction loss function until a parameter in the to-be-trained classification model converges, to obtain a video classification model.

Each convolutional layer group included in the to-be-trained classification model may include at least one bottleneck module, and the bottleneck module and the non-local module are alternately arranged in a case that the bottleneck module and the non-local module are in the same convolutional layer group.

Further, the extraction module 803 is further configured to:

perform depthwise separable convolution on feature maps corresponding to the plurality of video frames by using the bottleneck module, and perform channel doubling on the feature maps obtained after the depthwise separable convolution, to obtain a first feature map group; and input the first feature map group into the non-local module, and calculate, by the non-local module, correspondences between spatial positions included in each feature map as long-distance dependency features, to output a second feature map group including the long-distance dependency features.

The prediction loss function may include:

$$L = \begin{cases} -(1-y')^\gamma \log y' & y=1 \\ -y'^\gamma \log(1-y') & y=0 \end{cases}$$

where y=1 represents that a training sample is a positive sample, y=0 represents that a training sample is a negative sample, and y' represents that a value range of a probability value outputted by the to-be-trained classification model is greater than or equal to 0 and less than or equal to 1 in a case that a training sample is a positive sample, y being a preset value.

The first obtaining module 801 is further configured to:
extract a plurality of video frames from a to-be-processed video according to a temporal position;
determine a spatial position of each video frame in the plurality of video frames;
perform, according to a predetermined spatial size, multi-scale cropping on a video frame after a spatial position of the video frame is determined; and
scale and flip a video frame obtained after the cropping, to obtain the training dataset.

In addition, for related content in the apparatus embodiments, refer to the method embodiments, and details are not described herein.

In conclusion, in the video classification model construction apparatus provided in the embodiments of this disclosure, the non-local module is arranged in a three-dimensional convolutional neural network, and the non-local module is used to obtain the long-distance dependency feature. Compared with performing video classification depending on a feature map after the feature map is extracted by using a plurality of convolutional layers currently, in the embodiments of this disclosure, correlations between different pixels or between different feature maps may be obtained, thereby improving the accuracy of video classification.

In addition, in the video classification model construction apparatus provided in the embodiments of this disclosure, some of the convolution calculation layers in the bottleneck module are replaced by depthwise separable convolution calculation layers to reduce a quantity of parameters, reduce a calculation amount during classification, and improve efficiency of video classification.

In addition, in the video classification model construction apparatus provided in the embodiments of this disclosure, the quantity of channels of the feature map is appropriately increased to improve performance of feature extraction of the feature map, thereby improving the classification performance of the classification model.

In addition, in the video classification model construction apparatus provided in the embodiments of this disclosure, a loss function in a training stage of the classification model is also improved. By adding hyperparameters, the loss value of the model is prevented from being contributed by a large quantity of samples that are easy to be classified, thereby raising the concerns of the model about samples that are difficult to be classified.

Figure 10:
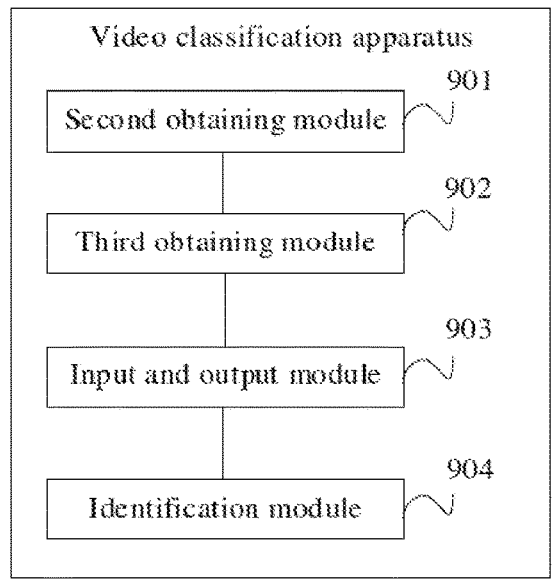
FIG. 10 is an example block diagram of another video classification apparatus according to an embodiment of this disclosure.

FIG. 10 is a block diagram of a video classification apparatus according to an embodiment of this disclosure. The apparatus shown in FIG. 10 may be disposed on a terminal. As shown in FIG. 10, the apparatus may include:
a second obtaining module 901, configured to obtain a to-be-classified video;
a third obtaining module 902, configured to obtain a plurality of video frames from the video according to a preset temporal position;
an input and output module 903, configured to: input the plurality of video frames into a pre-trained video classification model, and output at least one classification label of the plurality of video frames,
the video classification model being obtained through training by using any video classification model construction apparatus shown in FIG. 9; and
an identification module 904, configured to identify a category of the video according to the at least one classification label of the plurality of video frames.

In addition, for related content in the apparatus embodiments, refer to the method embodiments, and details are not described herein.

In conclusion, in the video classification apparatus provided in the embodiments of this disclosure, the non-local module is arranged in a three-dimensional convolutional neural network, and the non-local module is used to obtain the long-distance dependency feature. Compared with performing video classification depending on a feature map after the feature map is extracted by using a plurality of convolutional layers currently, in the embodiments of this disclosure, correlations between different pixels or between different feature maps may be obtained, thereby improving the accuracy of video classification.

In addition, in the video classification apparatus provided in the embodiments of this disclosure, some of the convolution calculation layers in the bottleneck module are replaced by depthwise separable convolution calculation layers to reduce a quantity of parameters, reduce a calculation burden during classification, and improve efficiency of video classification.

In addition, in the video classification apparatus provided in the embodiments of this disclosure, the quantity of channels of the feature map is appropriately increased to improve performance of feature extraction of the feature map, thereby improving the classification performance of the classification model.

In addition, in the video classification apparatus provided in the embodiments of this disclosure, a loss function in a training stage of the classification model is also improved. By adding hyperparameters, the loss value of the model is prevented from being contributed by a large quantity of samples that are easy to be classified, thereby raising the concerns of the model about samples that are difficult to be classified.

Figure 11:
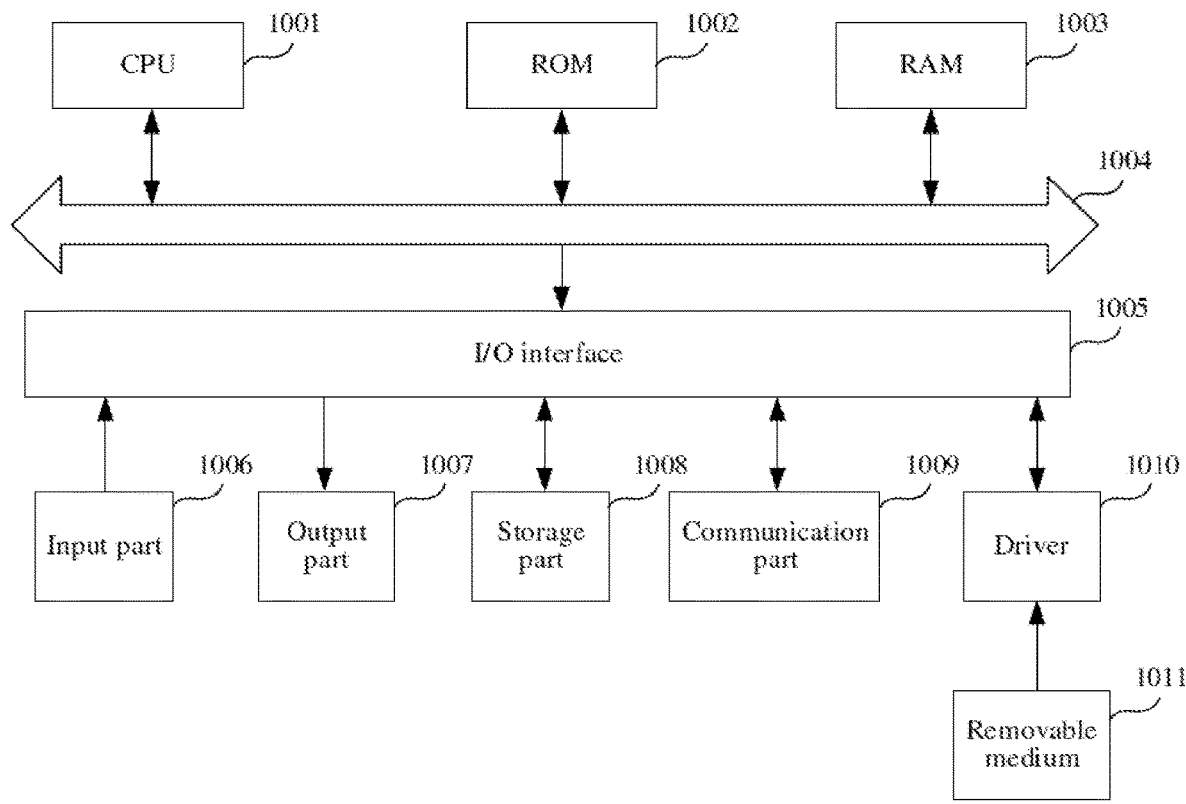
FIG. 11 is an example schematic structural diagram of a computer device according to an embodiment of this disclosure.

FIG. 11 is a schematic structural diagram of a computer device 1000 according to an embodiment of this disclosure. The computer device may include a central processing unit (CPU) 1001, which can perform various proper actions and processing according to a program stored in a read-only memory (ROM) 1002 or a program loaded from a storage part into a random-access memory (RAM) 1003. The RAM 1003 also stores various programs and data required to operate the system. The CPU 1001, the ROM 1002, and the RAM 1003 are connected to each other by using a bus 1004. An input/output (I/O) interface 1005 is also connected to the bus 1004.

The following components are connected to the I/O interface 1005: an input part 1006 including a keyboard, a mouse, or the like; an output part including a cathode ray tube (CRT), a liquid crystal display (LCD), a speaker, or the like; a storage part 1008 including a hard disk, or the like; and a communication part 1009 including a network interface card such as a LAN card or a modem. The communication part 1009 performs communication processing via a network such as the Internet. A driver is also connected to the I/O interface 1005 as required. A removable medium 1011, such as a magnetic disk, an optical disc, a magneto-optical disk, or a semiconductor memory, is installed on the drive 1010 as required, so that a computer program read from the removable medium is installed into the storage part 1008 as required.

Particularly, according to an embodiment of this disclosure, the processes described in the flowcharts may be implemented as computer software programs. For example, the method embodiments of this disclosure include a computer program product, the computer program product may include a computer program carried on a computer-readable medium, and the computer program may include program code used for performing the methods shown in the flowcharts. In such an embodiment, the computer program may be downloaded and installed from the network through the communication portion, and/or installed from the removable medium. When the computer program is executed by the CPU 1001, the above functions defined in the system of this disclosure are performed.

The computer-readable medium shown in this disclosure may be a computer-readable signal medium or a computer-readable storage medium or any combination of the two. The computer-readable storage medium may be, for example, but is not limited to, an electric, magnetic, optical, electro-magnetic, infrared, or semi-conductive system, apparatus, or component, or any combination thereof. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. In this disclosure, the computer-readable storage medium may be any tangible medium including or storing a program, and the program may be used by or in combination with an instruction execution system, apparatus, or device. In this disclosure, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any appropriate medium, including but not limited to: wireless transmission, a wire, an optical cable, radio frequency (RF), or the like, or any other suitable combination thereof.

The flowcharts and block diagrams in the accompanying drawings illustrate possible system architectures, functions and operations that may be implemented by a system, a method, and a computer program product according to various embodiments of this disclosure. In this regard, each box in a flowchart or a block diagram may represent a module, a program segment, or a part of code. The module, the program segment, or the part of code may include one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units in the embodiments of this disclosure may be implemented in a software manner, or may be implemented in a hardware manner, and the unit described can also be set in a processor. Names of the units do not constitute a limitation on the units in a specific case. The described units or modules may be disposed in a processor, which, for example, may be described as: a processor including a first obtaining module, an input module, an extraction module, an output module, and a training module. Names of the units or modules do not constitute a limitation on the units or modules in a specific case.

In another aspect, this disclosure further provides a computer-readable medium. The computer-readable medium may be the computer-readable medium included in the computer device described in the foregoing embodiments, or a stand-alone computer-readable medium not assembled into the computer device. The computer-readable medium carries one or more programs, the one or more programs, when executed by the computer device, causing the computer device to implement the video classification model construction method described in the foregoing embodiments.

For example, the computer device may implement the steps shown in FIG. 2: Step 101: Obtain training dataset, the training dataset including a plurality of video frames. Step 102: Input the training dataset into a to-be-trained classification model, the to-be-trained classification model including a plurality of convolutional layer groups and one output layer group, some of the convolutional layer groups including a non-local module. Step 103: Extract long-distance dependency features of the plurality of video frames by using the non-local module, the long-distance dependency features being used for representing association relationships between spatial positions included in the plurality of video frames. Step 104: Output the long-distance dependency features to the output layer group, to output predicted classification results of the plurality of video frames. Step 105: Train the to-be-trained classification model through a prediction loss function until a parameter in the to-be-trained classification model converges, to obtain a video classification model. In another example, the computer device may implement the steps shown in FIG. 2, FIG. 3, and FIG. 8.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

In addition, although the various steps of the method in this disclosure are described in a specific order in the accompanying drawings, this does not require or imply that the steps are bound to be performed in the specific order, or all the steps shown are bound to be performed to achieve the desired result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware.

In conclusion, in the video classification computer device or computer-readable medium provided in the embodiments of this disclosure, the non-local module is arranged in a three-dimensional convolutional neural network, and the non-local module is used to obtain the long-distance dependency feature. Compared with performing video classification depending on a feature map after the feature map is extracted by using a plurality of convolutional layers currently, in the embodiments of this disclosure, correlations between different pixels or between different feature maps may be obtained, thereby improving the accuracy of video classification.

The foregoing descriptions are merely exemplary embodiments of this disclosure and examples of the technical principles used. A person having ordinary skill in the art understands that the scope of this disclosure is not limited to the example technical solutions that are formed by the foregoing particular combinations of technical features, but shall also encompass other technical solutions formed by arbitrarily combining the foregoing technical features or equivalent features thereof without departing from the foregoing application concept. For example, technical solutions formed by replacing the foregoing features with technical features having similar functions disclosed in this disclosure (but not limited thereto) are also included.

What is claimed is:

1. A video classification model construction method, performed by a computer device, the method comprising:
   obtaining training dataset, the training dataset comprising a plurality of video frames;
   inputting the training dataset into a to-be-trained classification model, the to-be-trained classification model comprising a plurality of convolutional layer groups and one output layer group, at least one of the convolutional layer groups comprising a non-local module and each convolutional layer group comprising at least one bottleneck module, the bottleneck module and the non-local module being alternately arranged when the bottleneck module and the non-local module are present in a same convolutional layer group;
   performing depthwise separable convolution on feature maps corresponding to the plurality of video frames by using the bottleneck module, and performing channel doubling on feature maps obtained after the depthwise separable convolution to obtain a first feature map group;
   inputting the first feature map group into the non-local module, and calculating, by the non-local module, correspondences between spatial positions in each feature map as long-distance dependency features, to output a second feature map group comprising the long-distance dependency features of the plurality of video frames, the long-distance dependency features being used to represent association relationships between spatial positions of the plurality of video frames;
   outputting the long-distance dependency features to the output layer group, to generate predicted classification results of the plurality of video frames; and
   training the to-be-trained classification model through a prediction loss function until a parameter in the to-be-trained classification model converges, to obtain a video classification model.

2. The video classification model construction method according to claim 1, wherein the prediction loss function comprises:

$$L = \begin{cases} -(1-y')^{\gamma}\log y' & y=1 \\ -y'^{\gamma}\log(1-y') & y=0 \end{cases}$$

wherein y=1 represents that a training sample is a positive sample, y=0 represents that a training sample is a negative sample, y' represents that a value range of a probability value outputted by the to-be-trained classification model is greater than or equal to 0 and less than or equal to 1 in a case that a training sample is a positive sample, and y is a preset value.

3. The video classification model construction method according to claim 1, wherein obtaining the training dataset comprises:
   extracting a plurality of video frames from a to-be-processed video according to a temporal position;
   determining a spatial position of each video frame in the plurality of video frames;
   performing, according to a predetermined spatial size, multi-scale cropping on one or more of the plurality of video frames after spatial positions of the one or more of the plurality of video frames are determined; and
   scaling and flipping videoframes obtained after the cropping, to obtain the training dataset.

4. A video classification method, performed by a computer device, the method comprising:
   obtaining a to-be-classified video;
   obtaining a plurality of video frames from the to-be-classified video according to a preset temporal position;
   inputting the plurality of video frames into a video classification model, and outputting at least one classification label of the plurality of video frames, the video classification model being obtained through training by using the video classification model construction method according to claim 1; and
   identifying a category of the to-be-classified video according to the at least one classification label of the plurality of video frames.

5. A non-transitory computer-readable storage medium, storing a computer program, the computer program, when executed by a processor, implementing the method according to claim 4.

6. A non-transitory computer-readable storage medium, storing a computer program, the computer program, when executed by a processor, implementing the method according to claim 1.

7. A video classification model construction apparatus, comprising a memory for storing computer instructions and a processor in communication with the memory, wherein the processor is configured to execute the computer instructions to:
   obtain training dataset, the training dataset comprising a plurality of video frames;
   input the training dataset into a to-be-trained classification model, the to-be-trained classification model comprising a plurality of convolutional layer groups and one output layer group, at least one of the convolutional layer groups comprising a non-local module and each convolutional layer group comprising at least one bottleneck module, and the bottleneck module and the non-local module being alternately arranged when the bottleneck module and the non-local module are present in a same convolutional layer group;
   performing depthwise separable convolution on feature maps corresponding to the plurality of video frames by using the bottleneck module, and performing channel doubling on feature maps obtained after the depthwise separable convolution to obtain a first feature map group;

inputting the first feature map group into the non-local module, and calculating, by the non-local module, correspondences between spatial positions in each feature map as long-distance dependency features, to output a second feature map group comprising the long-distance dependency features of the plurality of video frames, the long-distance dependency features being used to represent association relationships between spatial positions comprised in the plurality of video frames;

output the long-distance dependency features to the output layer group, to generate predicted classification results of the plurality of video frames; and train the to-be-trained classification model through a prediction loss function until a parameter in the to-be-trained classification model converges, to obtain a video classification model.

8. The video classification model construction apparatus according to claim 7, wherein the prediction loss function comprises:

$$L = \begin{cases} -(1-y')^\gamma \log y' & y=1 \\ -y'^\gamma \log(1-y') & y=0 \end{cases}$$

wherein y=1 represents that a training sample is a positive sample, y=0 represents that a training sample is a negative sample, y' represents that a value range of a probability value outputted by the to-be-trained classification model is greater than or equal to 0 and less than or equal to 1 in a case that a training sample is a positive sample, and y is a preset value.

9. The video classification model construction apparatus according to claim 7, wherein to obtain the training dataset, the processor is configured to execute the computer instructions to:

extract a plurality of video frames from a to-be-processed video according to a temporal position;

determine a spatial position of each video frame in the plurality of video frames;

perform, according to a predetermined spatial size, multi-scale cropping on one or more of the plurality of video frames after spatial positions of the one or more of the plurality of video frames are determined; and scale and flip video frames obtained after the cropping, to obtain the training dataset.

10. A video classification apparatus, configured to:
obtain a to-be-classified video;
obtain a plurality of video frames from the to-be-classified video according to a preset temporal position;
input the plurality of video frames into a video classification model, and output at least one classification label of the plurality of video frames, the video classification model being obtained through training by using the video classification model construction apparatus according to claim 7; and
identify a category of the to-be-classified video according to the at least one classification label of the plurality of video frames.

11. A video classification method, performed by a computer device, the method comprising:
obtaining a video dataset comprising a plurality of video frames;

inputting the video dataset into a video classification model, the model comprising a plurality of convolutional layer groups and one output layer group, at least one of the convolutional layer groups comprising a non-local module and each convolutional layer group comprising at least one bottleneck module, the bottleneck module and the non-local module being alternately arranged when the bottleneck module and the non-local module are present in a same convolutional layer group;

performing depthwise separable convolution on feature maps corresponding to the plurality of video frames by using the bottleneck module, and performing channel doubling on feature maps obtained after the depthwise separable convolution to obtain a first feature map group;

inputting the first feature map group into the non-local module, and calculating, by the non-local module, correspondences between spatial positions in each feature map as long-distance dependency features, to output a second feature map group comprising the long-distance dependency features of the plurality of video frames, the long-distance dependency features being used to represent association relationships between spatial positions of the plurality of video frames; and outputting the long-distance dependency features to the output layer group, to generate predicted classification results of the video dataset.

12. The video classification method according to claim 11, wherein a prediction loss function comprises:

$$L = \begin{cases} -(1-y')^\gamma \log y' & y=1 \\ -y'^\gamma \log(1-y') & y=0 \end{cases}$$

wherein y=1 represents that a training sample is a positive sample, y=0 represents that a training sample is a negative sample, y' represents that a value range of a probability value outputted by the video classification model is greater than or equal to 0 and less than or equal to 1 in a case that a training sample is a positive sample, and y is a preset value.

13. The video classification method according to claim 11, wherein obtaining the video dataset comprises:
extracting video frames from a video input data according to a temporal position;
determining a spatial position of each video frame in the extracted video frames;
performing, according to a predetermined spatial size, multi-scale cropping on one or more of the plurality of video frames after spatial positions of the one or more of the plurality of video frames are determined; and
scaling and flipping each video frame obtained after the cropping, to obtain the video dataset.

14. A non-transitory computer-readable storage medium, storing a computer program, the computer program, when executed by a processor, implementing the method according to claim 11.

15. A computer device, comprising:
one or more processors; and
a memory, configured to store one or more programs, the one or more programs, when executed by the one or more processors, causing the one or more processors to implement the method according to claim 11.

* * * * *